United States Patent
Lemmers, Jr. et al.

(10) Patent No.: US 11,143,309 B2
(45) Date of Patent: Oct. 12, 2021

(54) DISCONNECT BEARING AND INPUT SEAL FOR A VARIABLE FREQUENCY STARTER GENERATOR

(71) Applicant: Hamilton Sundstrand Corporation, Charlotte, NC (US)

(72) Inventors: Glenn C. Lemmers, Jr., Loves Park, IL (US); David S. Behling, Belvidere, IL (US); Erika M. Danckers, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 173 days.

(21) Appl. No.: 16/155,531

(22) Filed: Oct. 9, 2018

(65) Prior Publication Data

US 2020/0112222 A1    Apr. 9, 2020

(51) Int. Cl.
*F16J 15/34* (2006.01)
*F16C 33/78* (2006.01)
*H02K 5/124* (2006.01)

(52) U.S. Cl.
CPC ....... *F16J 15/3464* (2013.01); *F16C 33/7886* (2013.01); *F16J 15/3472* (2013.01); *H02K 5/124* (2013.01)

(58) Field of Classification Search
CPC ............... F16C 33/7886; F16J 15/3464; F16J 15/3472; H02K 5/124
USPC .................................................. 277/390, 397
See application file for complete search history.

(56) References Cited

U.S. PATENT DOCUMENTS

| 4,600,318 | A | 7/1986 | Miller |
| 9,194,433 | B2* | 11/2015 | Qiu ..................... F16C 33/7846 |
| 9,476,459 | B2* | 10/2016 | Lemmers, Jr. .......... F16D 1/116 |
| 9,574,618 | B2 | 2/2017 | Lemmers, Jr. |
| 9,784,380 | B2 | 10/2017 | Lemmers, Jr. |
| 2014/0219598 | A1* | 8/2014 | Grosskopf .............. F16C 33/38 384/495 |
| 2014/0265738 | A1 | 9/2014 | Anderson et al. |
| 2015/0192175 | A1* | 7/2015 | Qiu ...................... H02K 5/1732 384/475 |
| 2015/0192177 | A1* | 7/2015 | Lemmers, Jr. ............ F16D 1/04 403/359.5 |
| 2017/0098978 | A1 | 4/2017 | Behling et al. |
| 2020/0106340 | A1* | 4/2020 | Turner .................... H02K 9/02 |

FOREIGN PATENT DOCUMENTS

EP          3486534 A1    5/2019

OTHER PUBLICATIONS

Extended European Search Report; International Application No. 19201966.9-1015; International Filing Date: Oct. 8, 2019; dated Mar. 9, 2020; 11 pages.

* cited by examiner

*Primary Examiner* — Nicholas L Foster
(74) *Attorney, Agent, or Firm* — Cantor Colburn LLP

(57) ABSTRACT

A sealing assembly of an input shaft includes a support structure, a bearing assembly, and an input seal. The input seal including an input seal housing having a first portion and a second portion. The first portion is arranged adjacent the bearing assembly. At least one face plate anti-rotation pin is coupled to the input seal housing and positioned adjacent the input shaft. A face plate is positioned adjacent the second portion. The face plate is configured to directly contact the input shaft.

7 Claims, 2 Drawing Sheets

DISCONNECT BEARING AND INPUT SEAL FOR A VARIABLE FREQUENCY STARTER GENERATOR

BACKGROUND

Embodiments of the disclosure relate to a variable frequency generator, and more particularly, to a sealing assembly of a variable frequency generator input.

Variable frequency generators (VFG) are utilized as part of an electrical generating system of an aircraft to output variable frequency power over the engine normal operating speed range. A variable frequency generator typically includes an input shaft that is rotatably connected to an engine accessory gearbox. A shaft bearing is concentrically mounted on the input shaft to facilitate rotation of the input shaft.

Recent VFG designs include a detachable drive shaft coupled to one end of the input shaft. This design allows for one end of the input shaft to be disconnected from the drive shaft if a fault in the VFG is detected, while the opposite end of the input shaft remains coupled to the gearbox. During operation of variable frequency generators used in aerospace applications, it has been observed that heat created by the frictional engagement between a fixed and rotating surface associated with an input shaft may result, not only in damage to the bearings supporting the input shaft or the drive shaft, but also in damage to the adjacent input shaft or drive shaft. Accordingly, it is desirable to replace the existing hydrodynamic input seal used to seal one or more bearings of the input shaft with a more reliable sealing interface.

BRIEF DESCRIPTION

According to an embodiment, a sealing assembly of an input shaft includes a support structure, a bearing assembly, and an input seal. The input seal including an input seal housing having a first portion and a second portion. The first portion is arranged adjacent the bearing assembly. At least one face plate anti-rotation pin is coupled to the input seal housing and positioned adjacent the input shaft. A face plate is positioned adjacent the second portion. The face plate is configured to directly contact the input shaft.

In addition to one or more of the features described above, or as an alternative, in further embodiments the input seal housing is affixed to the support structure.

In addition to one or more of the features described above, or as an alternative, in further embodiments the input seal housing further comprises a radial flange, the radial flange being mounted to an end surface of the support structure.

In addition to one or more of the features described above, or as an alternative, in further embodiments comprising a sealing element disposed between the input seal housing and at least one of the face plate and the support structure.

In addition to one or more of the features described above, or as an alternative, in further embodiments the face plate anti-rotation pin is positioned radially between the face plate and the second portion of the input seal housing.

In addition to one or more of the features described above, or as an alternative, in further embodiments the face plate is formed from a carbon material.

In addition to one or more of the features described above, or as an alternative, in further embodiments the bearing assembly further comprises an inner race configured to support the input shaft, an outer race configured to couple to the support structure, and at least one rolling element positioned within a clearance between the inner race and the outer race.

In addition to one or more of the features described above, or as an alternative, in further embodiments at least one of the input seal housing and the sealing element is arranged in direct contact with the bearing assembly.

In addition to one or more of the features described above, or as an alternative, in further embodiments the first portion of the input seal housing directly contacts the outer race.

In addition to one or more of the features described above, or as an alternative, in further embodiments the sealing element is aligned with the clearance between the inner race and the outer race.

According to another embodiment, a generator assembly includes a generator housing including a support structure coupled thereto. A bearing includes an outer race and an inner race defining a bore having a bore diameter. The outer race is coupled to the support structure and the inner race is configured to rotate about a center axis. The inner race and the outer race define a clearance there between that supports at least one rolling element. An input shaft extends through the bore along the center axis and includes a first end configured to rotatably couple to a gearbox. An input seal is mounted to the bearing support structure. The input seal forms a contact seal with the input shaft and the bearing.

In addition to one or more of the features described above, or as an alternative, in further embodiments comprising a rotor having a drive shaft, the drive shaft arranged coaxially with the input shaft such that the drive shaft is selectively coupleable to the input shaft to transfer rotation between the rotor and the gearbox.

In addition to one or more of the features described above, or as an alternative, in further embodiments the input seal further comprises an input seal housing having a first portion and a second portion, the first portion being arranged adjacent the bearing assembly; a face plate anti-rotation pin coupled to the input seal housing and positioned adjacent the clearance bearing assembly; and a face plate positioned adjacent the second portion, the face plate being configured to directly contact the input shaft.

In addition to one or more of the features described above, or as an alternative, in further embodiments the input seal housing is affixed to the support structure.

In addition to one or more of the features described above, or as an alternative, in further embodiments the input seal housing further comprises a radial flange, the radial flange being mounted to an end surface of the support structure.

In addition to one or more of the features described above, or as an alternative, in further embodiments at least one of the input seal housing and the face plate anti-rotation pin is arranged in direct contact with the bearing assembly.

In addition to one or more of the features described above, or as an alternative, in further embodiments the first portion of the input seal housing directly contacts the outer race.

In addition to one or more of the features described above, or as an alternative, in further embodiments the face plate anti-rotation pin is aligned with the clearance between the inner race and the outer race.

In addition to one or more of the features described above, or as an alternative, in further embodiments comprising at least one sealing element disposed between the input seal housing and at least one of the face plate and the support structure.

In addition to one or more of the features described above, or as an alternative, in further embodiments the at least one sealing element in an O-ring.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
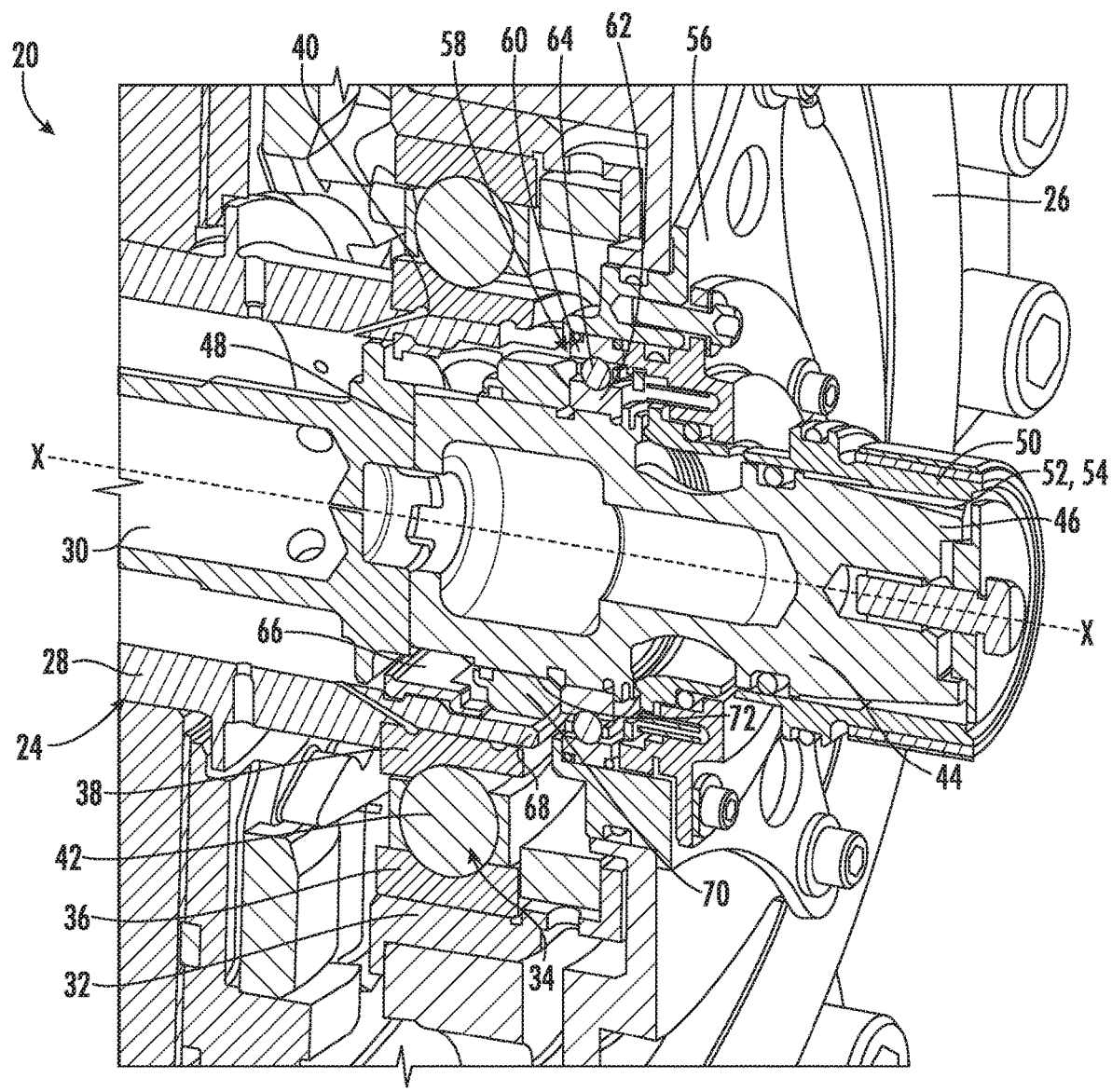
FIG. 1 is a cross-sectional view of variable frequency generator according to an embodiment.

Referring now to FIG. 1, a cross-sectional view of an example of a variable frequency generator ("VFG") 20 is illustrated. As shown, the VFG 20 includes a rotor 24 and a stationary housing 26. The rotor 24 further includes a rotor shaft 28 and a drive shaft 30 disposed within and movably coupled to the rotor shaft 28. The drive shaft 30 defines a longitudinal central axis X of the rotor 24. In an embodiment, the drive shaft 30 is operable not only to rotate about the axis X, but also to translate along the axis X.

The rotor shaft 28 is mounted to a bearing liner 32 of the housing 26 by a first bearing assembly 34. The first bearing assembly 38 includes an outer race 36 and an inner race 38. The outer race 36 is coupled to the bearing liner 32. The outer race 36 may be coupled directly to the bearing liner 32, or alternatively, no bearing liner may be used and the outer race 36 may couple directly to housing 26. The inner race 38 may be coupled to, or alternatively, may be integrally formed with an exterior surface 40 of the rotor housing 24. One or more rolling elements 42 are positioned between the outer race 36 and the inner race 38 to allow the inner race 38, and therefore the rotor 24, to rotate about central axis X with respect to the outer race 36.

The VFG 20 additionally includes an input shaft 44 located at least partially within the housing 26 and arranged coaxially with drive shaft 30. In an embodiment, the input shaft 44 and the drive shaft 30 are spaced laterally along the axis X. As shown, the input shaft 44 has a first end 46 and a second end 48. The first end 48 is configured to couple to a gearbox (not shown), such as through a gearbox adapter 50 for example. In an embodiment, the first end 46 of the input shaft 44 includes a plurality of splines 52 configured to cooperate with a corresponding plurality of splines 54 formed in the gearbox adapter 50 to limit rotational movement of the input shaft 44 relative to the gearbox adapter 50 as the input shaft 44 and the gearbox adapter 50 rotate about the axis X. The second end 48 of the input shaft 44 is configured to selectively couple to the drive shaft 30 of the rotor 24. In an embodiment, the second end 48 of the input shaft 44 includes locking portions (not shown) configured to engage with one or more corresponding portions formed in the adjacent end of the drive shaft 30.

The input shaft 44 is similarly coupled to the housing 26 via a bearing support structure 56 and a second bearing assembly 58. In the illustrated, non-limiting embodiment, the second bearing assembly 58 is a ball bearing assembly including an outer race 60 coupled to the bearing support structure 56, an inner race 62 coupled to the input shaft 44, and a plurality of rolling elements 64 positioned between the outer race 60 and the inner race 62 to allow the inner race 62, and therefore the input shaft 44, to rotate about the center axis X with respect to the outer race 60. Although the rolling elements 42, 64 of the first and second bearing assemblies 34, 58 associated with both the drive shaft 30 and the input shaft 44 are illustrated as ball elements, it should be understood that a rolling element 42, 64 having any suitable configuration is contemplated within the scope of the disclosure. Further, the first and second bearing assemblies 34, 58 may, but need not have the same configuration.

A torque nut 66 is mounted to an interior surface of the rotor shaft 28 near the end 68 of the rotor shaft 28 adjacent the input shaft 44. A locking nut 60 is similarly mounted to an exterior surface 72 of the input shaft 44 near the second end 48 of the input shaft 44. In an embodiment, an outer diameter of the locking nut 60 is generally smaller than the inner diameter of the rotor shaft 28. As a result, when the drive shaft 30 and the input shaft 44 are coupled, a surface of the locking nut 70 does not contact the interior surface of the rotor shaft 28.

Figure 2:
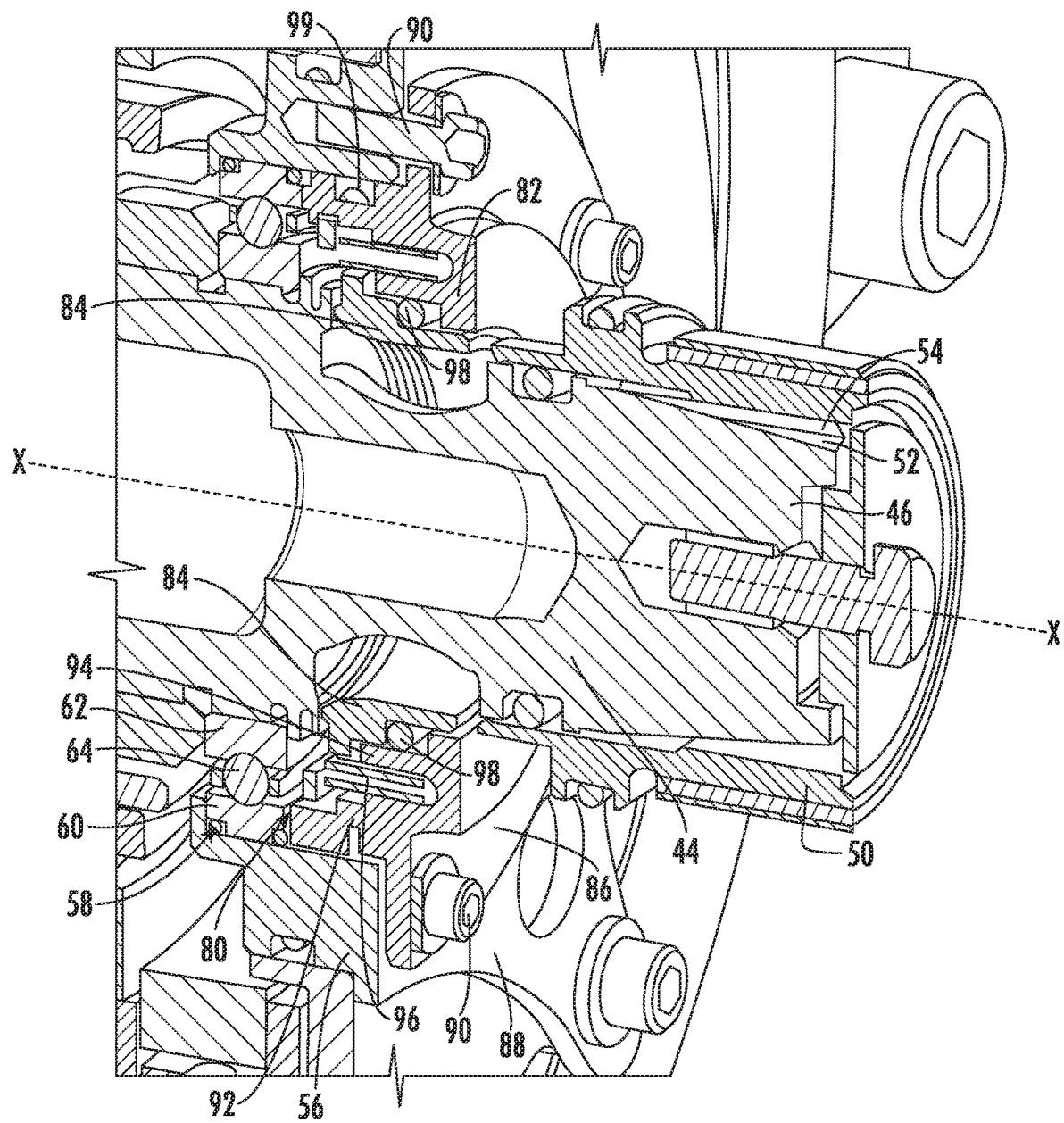
FIG. 2 is an enlarged view of a generator input shaft arrangement included with the variable frequency generator illustrated in FIG. 1 according to an embodiment.

As best shown in FIG. 2, a stationary input seal assembly 80 forms a contact seal with input shaft 44 to restrict oil leakage and to prevent dirt and debris from impeding movement of the rolling elements 64 of the second bearing assembly 58. In the illustrated, non-limiting embodiment, the input seal assembly 80 includes an input seal housing 82 and a face plate 84. The input seal housing 82 may be formed from any suitable material, such as aluminum for example, and is mounted to and seals against the support structure 56. In the illustrated non-limiting embodiment, the input seal housing 82 includes a radially extending flange 86 disposed in overlapping arrangement with an end surface 88 of the support structure 56. One or more fasteners 90 may be used to affix the flange 86 to the end of the support structure 56.

The input seal housing 82 additionally includes a first portion 92 and a second portion 94 extending axially from the flange 86, generally parallel to the axis of rotation X of the input shaft 44. The first portion 92 is disposed in contact with an adjacent surface of the support structure 56. The second portion 94 is radially spaced from the first portion 92 towards an inner diameter of the flange 86 such that a circumferential clearance is defined between the first and second portions 92, 94. At least one face plate anti-rotation pin 96 is arranged within the clearance between the first and second portions 92, 94. The one or more face place anti-rotation pins 96 are thrust against the input shaft by a biasing mechanism (not shown), such as a helical spring for example. A distal end of the first portion 92 and/or the face plate anti-rotation pin 96 is disposed adjacent to and in direct contact with a side surface of the second bearing assembly 58. In an embodiment, the first portion 92 of the input seal housing 82 directly contacts the fixed outer race 60 and the face plate anti-rotation pin 96 directly contacts the clearance between the inner and outer races 60, 62.

The face plate 84 is positioned at the inner diameter of the flange 86 and extends axially, generally parallel to the first and second portions 92, 94 and the axis X of the input shaft 44 and drive shaft 30. A first sealing mechanism 98, such as an O-ring for example, may be located within the radial clearance formed between the face plate 84 and the second portion 94. Similarly, a second sealing mechanism 99, such as another O-ring for example may be positioned between the first portion 92 of the bearing support structure. In an embodiment, the axial length of the second portion 94 is shorter than the axial length of the first portion 92. A portion of the face plate 84 is arranged adjacent the distal end of the second portion 94 between the input seal housing 82 and a radial surface of the input shaft 44. Accordingly, the non-rotating face plate 84 directly contacts the rotating input shaft 44.

During normal operation of the VFG 20, the input shaft 44 is coupled to the drive shaft 30, such that the input shaft 44 and drive shaft 30 rotate in unison about the axis X. However, if it is detected that the VFG 20 is improperly being driven by the input shaft 44, or other faults are detected such as overheating for example, the input shaft 44 is disconnected from the drive shaft 30, by translating the drive shaft 30 along the axis X. Accordingly, the drive force applied by the drive shaft 30 may be removed from the input shaft 44 such that damage to the gearbox (not shown) may be prevented. Further, rotational inertia causes the input shaft 44 to continue to rotate for a predetermined period of time after the input shaft and the drive shaft 30 are decoupled. As a result, the second ball bearing assembly 58 and the seal formed therewith by the input seal assembly 80 should operate properly for a predetermined period of time.

The contact input seal assembly 80 illustrated and described herein directly contacts the input shaft 44 and second bearing assembly 58, unlike a hydrodynamic seal where a flow of a fluid, such as air for example, forms a sealing microfilm within the gap between elements. The contact input seal assembly 80 has a reduced cost and improved reliability associated therewith. In addition, the input seal assembly 80 has the added benefit of being suitable for use in retrofit applications of existing VFG's.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sealing assembly of an input shaft, comprising:
   a support structure;
   a bearing assembly having an outer race coupled to the support structure, an inner race couplable to the input shaft, and a plurality of rolling elements positioned between the outer race and the inner race; and
   an input seal including:
      an input seal housing affixed to the support structure, the input seal housing having a first portion, a second portion, and a radially extending flange, the first portion being arranged adjacent the support structure and a distal end of the first portion being arranged in direct contact with the bearing assembly;
      a face plate positioned arranged at an inner diameter of the flange and extending parallel to the second portion of the input seal housing, the face plate being disposed between the second portion of the input seal housing and the input shaft; and
      at least one face plate anti-rotation pin coupled to the input seal housing and positioned adjacent the input shaft arranged within a clearance between the first portion and the second portion;
      wherein the input seal housing and the at least one face plate anti-rotation pin are arranged in direct contact with the bearing assembly.

2. The sealing assembly of claim 1, wherein the input seal housing further comprises a radial flange, the radial flange being mounted to an end surface of the support structure.

3. The sealing assembly of claim 1, further comprising a sealing element disposed between the input seal housing and at least one of the face plate and the support structure.

4. The sealing assembly of claim 1, wherein the face plate anti-rotation pin is positioned radially between the face plate and the first portion of the input seal housing.

5. The sealing assembly of claim 1, wherein the face plate is formed from a carbon material.

6. The sealing assembly of claim 1, wherein the first portion of the input seal housing directly contacts the outer race.

7. The sealing assembly of claim 1, wherein the at least one face plate anti-rotation pin is aligned with the clearance between the inner race and the outer race.

* * * * *